(12) United States Patent
Dvorka et al.

(10) Patent No.: US 6,702,184 B2
(45) Date of Patent: Mar. 9, 2004

(54) COLLECTION OPTICS FOR LOW PROFILE SINGLE LINE SCANNING ASSEMBLY IN COMPACT BAR CODE READERS

(75) Inventors: Paul Dvorka, East Setauket, NY (US); Takeshi Yamazaki, Tokyo (JP)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/194,353

(22) Filed: Jul. 12, 2002

(65) Prior Publication Data

US 2004/0007622 A1 Jan. 15, 2004

(51) Int. Cl.[7] ................................................. G02B 5/00
(52) U.S. Cl. ............................ 235/462.32; 235/462.43; 359/642
(58) Field of Search ....................... 235/462.32, 462.22, 235/462.43; 359/642

(56) References Cited

U.S. PATENT DOCUMENTS

| | | | |
|---|---|---|---|
| 2,748,020 A | 5/1956 | Parsons et al. | 428/434 |
| 4,004,851 A | 1/1977 | Negishi et al. | 359/614 |
| 4,332,706 A | 6/1982 | Uehara et al. | 523/450 |
| 4,473,746 A * | 9/1984 | Edmonds | 250/216 |
| 5,372,334 A * | 12/1994 | Cuadros | 244/3.11 |
| 5,552,592 A * | 9/1996 | Dvorkis et al. | 235/462.17 |
| 5,920,061 A * | 7/1999 | Feng | 235/472.01 |
| 5,936,239 A | 8/1999 | Tsai et al. | 250/239 |
| 5,984,188 A * | 11/1999 | Dvorkis et al. | 235/472.01 |

* cited by examiner

*Primary Examiner*—Diane I. Lee
*Assistant Examiner*—Kumiko C. Koyama
(74) *Attorney, Agent, or Firm*—Kirschstein et al.

(57) ABSTRACT

An apparatus for reading bar code symbols having parts of different light reflectivity by a scanning beam which forms a scan line through the bar code symbol includes focusing optics for collecting light reflected off at least a portion of the bar code symbol including a front surface for receiving the incoming light, and a first surface adjacent one end of the front surface, and a second surface adjacent to the other end of the front surface, and a rear surface. A photosensor is positioned so as to receive light collected by the focusing optics and transmitted through the rear surface, and for generating an electrical signal indicative of the detected light intensity. The first and second surfaces have different light reflectivity properties.

8 Claims, 4 Drawing Sheets

COLLECTION OPTICS FOR LOW PROFILE SINGLE LINE SCANNING ASSEMBLY IN COMPACT BAR CODE READERS

RELATED APPLICATIONS

The present application is related to U.S. patent application Ser. No. 10/125,149 filed Apr. 18, 2002, which is hereby incorporate d by reference.

BACKGROUND OF THE INVENTION

1. Field of the Invention

The field of the invention relates to electro-optical readers or scanning systems, such as bar code symbol readers, and more particularly to the collection optics used in a scanning module for u se in applications requiring a relatively long, single scan line near the reader in a compact bar code reader.

2. Description of the Related Art

Electro-optical readers, such as bar code symbol readers, are now very common. Typically, a bar code symbol comprises one or more rows of light and dark regions, typically in the form of rectangles. The widths of the dark regions, i.e., the bars and/or the widths of the light regions, i.e., the spaces, between the bars encode information in the symbol.

A bar code symbol reader illuminates the symbol and senses light reflected from the regions of differing light reflectivity to detect the relative widths and spacings of the regions and derive the encoded information. Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the readers. The readers therefore must be easy and convenient to operate.

A variety of scanning systems is known. One particularly advantageous type of reader is an optical scanner which scans a beam of light, such as a laser beam, across the symbols. Laser scanner systems and components of the type exemplified by U.S. Pat. No. 4,387,297 and U.S. Pat. No. 4,760,248, which are owned by the assignee of the instant invention and are incorporated by reference herein, have generally been designed to read indicia having parts of different light reflectivity, i.e., bar code symbols, particularly of the Universal Product Code (UPC) type, at a certain working range or reading distance from a hand-held or stationary scanner.

In the laser beam scanning systems known in the art, a single laser light beam from a light source is directed by a lens or other optical components along a light path toward a target that includes a bar code symbol on a target surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the symbol, or scan the field of view of a sensor of the scanner, or do both. The laser beam may be moved by optical or opto-mechanical means to produce a scanning light beam. Such action may be performed by either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 to Krichever, et al. describes laser, optical and sensor components mounted on a drive for repetitive reciprocating motion either about an axis or in a plane to effect scanning of the laser beam.

Another type of bar code scanner employs electronic means for causing the light beam to be deflected and thereby scan a bar code symbol, rather than using a mechanical motion to move or deflect the beam. For example, a linear array of closely spaced light sources activated one at a time in a regular sequence may be transmitted to the bar code symbol to simulate a scanned beam from a single source. Instead of a single linear array of light sources, a multiple-line array may also be employed, thereby producing multiple scan lines. Such type of bar code reader is disclosed in U.S. Pat. No. 5,258,605 to Metlitsky, et al.

Bar code reading systems also include a sensor, or photodetector which detects light reflected or scattered from the symbol. The photodetector or sensor is positioned in the scanner in an optical path so that it has a field of view which ensures the capture of a portion of the light which is reflected or scattered off the symbol, detected, and converted into an electrical signal. Different photodiode arrangements are described in U.S. Pat. No. 5,635,700; U.S. Pat. No. 5,682,029; and U.S. Pat. No. 6,213,399.

In retroreflective light collection, a single optical component, e.g., a reciprocally oscillatory mirror, such as described by Krichever, et al. in U.S. Pat. No. 4,816,661 or by Shepard, et al. in U.S. Pat. No. 4,409,470, both herein incorporated by reference, and U.S. Pat. No. 6,114,712, scans the beam across a target surface and directs the collected light to a detector. The mirror surface usually is relatively large to receive as much incoming light as is possible. Only a small detector is required since the mirror can focus the light onto a small detector surface, which increases signal-to-noise ratio.

Of course, small scan elements are preferable because of the reduced energy consumption and increased frequency response. When the scan element becomes sufficiently small, however, the area of the scanning mirror can no longer be used as the aperture for the received light. One solution is to use a staring detection system (a non-retroreflective system) which receives a light signal from the entire field which the scanned laser spot covers.

In non-retroreflective light collection, the reflected laser light is not collected by the same optical component used for scanning. Instead, the detector is independent of the scanning beam, and is typically constructed to have a large field of view so that the reflected laser light traces across the surface of the detector. Because the scanning optical component, such as a rotating mirror, need only handle the outgoing light beam, it can be made much smaller. On the other hand, the detector must be relatively large in order to receive the incoming light beam from all locations in the scanned field.

Electronic circuitry and software decode the electrical signal into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process of bar code reading systems usually works in the following way. The analog signal from the sensor or photodetector may initially be filtered and processed by circuitry and/or software to remove noise, adjust the dynamic range, or compensate for signal non-uniformities. Samples may then be taken of the analog signal, and applied to an analog-to-digital converter to convert the samples to digital data. See, for example, U.S. Pat. No. 6,170,749, which is hereby incorporated by reference. Alternatively, analog circuitry may be used to digitize the shape of the signal.

A variety of mirror and motor configurations can be used to move the beam in a desired scanning pattern. A scanner which produces an elongated scan line is described in U.S. Pat. No. 5,621,203. U.S. Pat. No. 4,251,798 discloses a rotating polygon having a planar mirror at each side, each mirror tracing a scan line across the symbol. U.S. Pat. No. 4,387,297 and U.S. Pat. No. 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted. U.S. Pat. No. 6,247,647 describes an arrangement for providing either a multiple line, or single line, scan pattern by means of a controller. All of the above-mentioned United States patents are incorporated herein by reference.

In electro-optical scanners of the type discussed above, the implementation of the laser source, the optics, the mirror structure, the drive to oscillate the mirror structure, the photodetector, and the associated signal processing and decoding circuitry as individual components all add size and weight to the scanner. In applications involving protracted use, a large, heavy scanner can produce user fatigue. When use of the scanner produces fatigue or is in some other way inconvenient, the user is reluctant to operate the scanner. Any reluctance to consistently use the scanner defeats the data gathering purposes for which such bar code systems are intended. Also, a need exists for an interchangeable, compact, slim module able to fit into small compact devices, such as notebooks, portable digital assistants, pagers, cell phones, and other pocket appliances.

Thus, an ongoing objective of bar code reader development is to miniaturize the reader as much as possible, and a need still exists to further reduce the size and weight of the scan module and to provide suitable collection optics in a relatively thin or flat scan module, so that the single scan line can be elongated close to the reader and still enable a symbol to be read.

SUMMARY OF THE INVENTION

OBJECTS OF THE INVENTION

It is an object of the present invention to provide a collection optics for use in a bar code reader capable of emitting an elongated scan line close to the module.

It is another object of the invention to provide a module with dual, spaced apart collection optics having different characteristics.

It is a further object of the present invention to provide collection optics for use in non-retroreflective scan modules with multiple photodetectors.

It is still a further object of the present invention to provide collection optics in a scan module which adjusts the optical power as a function of the reflected light position on the scan line.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which invention could be of significant utility.

FEATURES OF THE INVENTION

Briefly, and in general terms, the present invention provides an apparatus for reading bar code symbols having parts of different light reflectivity by a scanning beam which forms a scan line across the bar code symbol. The apparatus includes focusing optics for collecting light reflected off at least a portion of the bar code symbol. The optics has a front surface for receiving the incoming light, and a first surface adjacent one end of the front surface, and a second surface adjacent to the other end of the front surface, the first and second surfaces having different light reflectivity properties, and a rear surface. The apparatus also includes a photosensor positioned so as to receive the light collected by the focusing optics and transmitted through the rear surface, and for generating an electrical signal indicative of the detected light intensity.

Incoming light from both ends of the scan line are relatively weak in intensity and directed to one of the first and second surfaces for reflection to the photosensor. Incoming light from the middle of the scan line is relatively stronger in intensity and is directed to the other of the first and second surfaces for weaker reflection or absorption prior to being directed to the photosensor. Advantageously, the first and second surfaces are locked at opposite side surfaces of one or more focusing lenses of the optics in front of the photosensor.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

The invention relates to bar code readers of the type generally described in the above identified patents and patent applications for reading bar code symbols. As used in this specification and the claims, the term "bar code symbol" is intended to be broadly construed and to cover not only symbol patterns composed of alternating bars and spaces, but also other graphic patterns, such as dot or matrix array patterns, and,.in short, indicia having portions of different light reflectivity or surface characteristics that results in contrasting detected signal characteristics that can be used for encoding information and can be read and decoded with the type of apparatus disclosed herein.

Figure 1:
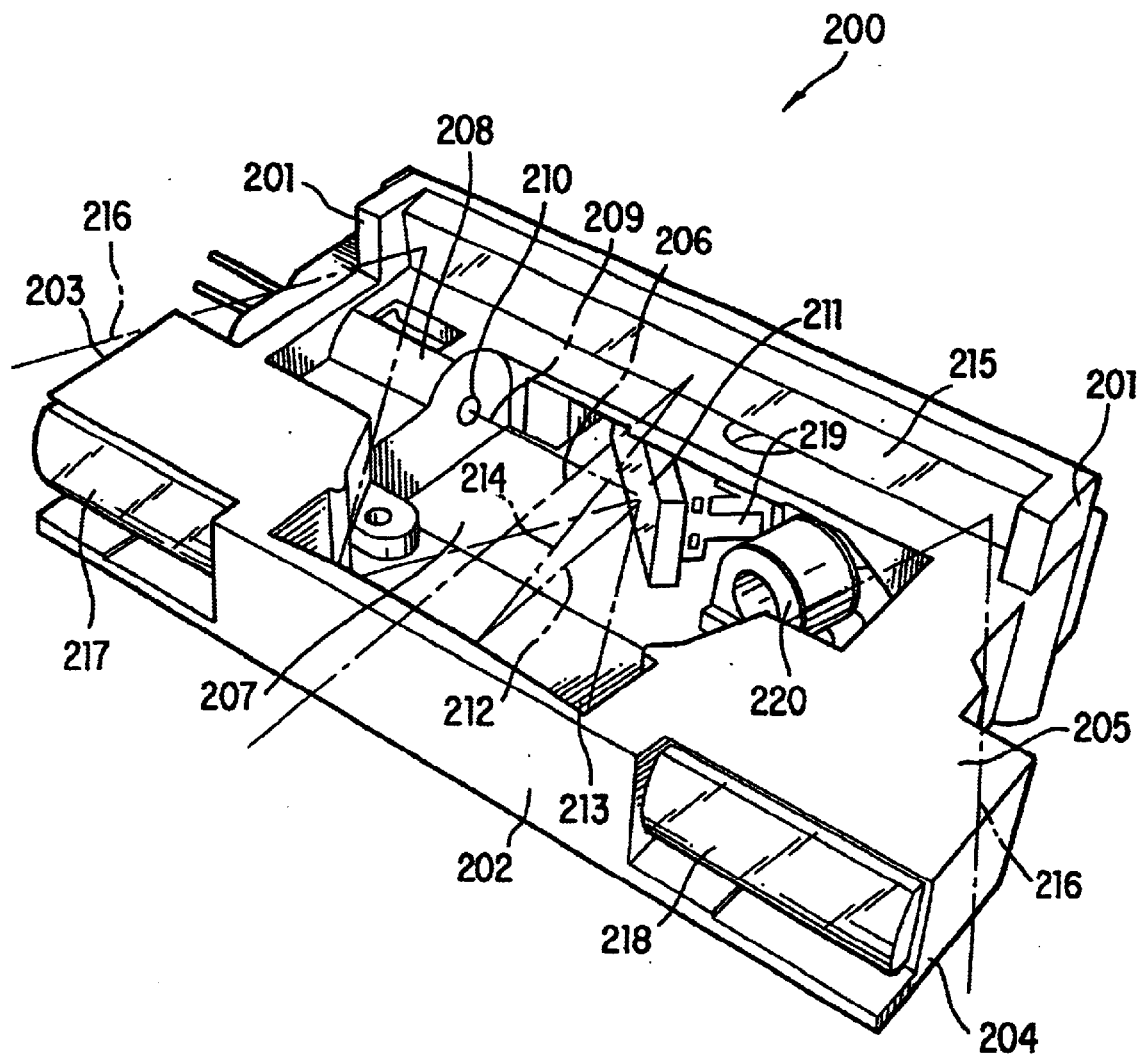
FIG. 1 is a perspective view of an optical assembly in which the collection optics according to a first preferred embodiment of the invention may be embodied.

As a preferred embodiment, we describe the implementation of the collection optics of the present invention in a laser scanning, bar code reading module similar to the module illustrated in FIG. 1. The modular device of FIG. 1 is generally of the style disclosed in U.S. Pat. No. 5,367,151, issued to Dvorkis, et al., assigned to Symbol Technologies, Inc. and hereby incorporated by reference herein, and also similar to the configuration of a bar code reader commercially available as part number SE 1000 or SE 1200 from Symbol Technologies, Inc. of Holtsville, N.Y. Alternatively, or in addition, features of U.S. Pat. No. 4,387,297 and U.S. Pat. No. 4,760,248 issued to Swartz, et al., or U.S. Pat. No. 4,409,470 issued to Shepard, et al., both such patents being assigned to Symbol Technologies, Inc., may be employed in constructing the bar code reader module of FIG. 1. U.S. Pat. No. 4,760,248, U.S. Pat. No. 4,387,297 and U.S. Pat. No. 4,409,470 are incorporated herein by reference.

The module 200 shown in FIG. 1 is formed from an integral frame or assembly 201 which is generally a rectangular parallelepiped in shape, having a front wall 202, side walls 203 and 204, preferably an open top surface 205 over which a laser beam 206 is scanned along a scanning path 216, and a bottom surface (not shown) enclosed by a printed circuit board (PCB) 207 on which electrical components may be mounted. A laser diode assembly 208 is mounted on the frame 201 for producing a light beam 209, which is emitted through aperture 210 in the laser diode assembly. The light beam 209 is directed to the scanning mirror 211 from which it is reflected and scanned along path 212 to fold mirror 213 (only the edge of which is seen) which is mounted on the front wall 202 of the assembly. The beam is then reflected from fold mirror 213 along path 214 to the fold mirror 215. The beam is then reflected from mirror 215 and directed along path 206 over the top surface 205 and exteriorly of the module 200 in the direction of a target, typically a bar code symbol 228 (See FIG. 2).

Light is scattered or reflected from the symbol to a pair of optical collection lenses 217 and 218 behind which are a pair of photodetectors. The front surfaces of such lenses, according to the first preferred embodiment of the present invention, are cylindrical, with an axis parallel to the scan line.

FIG. 1 also depicts a drive coil 220 and moving mirror assembly 219 which supports the mirror 211 and moves in response to current changes in the drive coil 220.

The laser diode assembly 208 may be operated in a continuous "constant power" mode, pulsed, or modulated with different power levels, depending on the specific application. It is also known to provide circuitry to maintain the laser diode at a predetermined output power level using a closed-loop feedback circuit using a monitor photodiode associated with the diode.

The optical subassembly associated with the laser diode assembly 208 may include a focusing lens and/or aperture stop of the following lens types, depending on the application: spherically symmetric glass or plastic lenses; aspheric glass or plastic lenses, rotationally symmetric as well as non-rotationally symmetric around the optical axis, such as cylindrical optical elements as well as including gradient index lenses, Fresnel lenses, binary optical lenses, or multi-level binary optical lenses; lens systems where the lens diameter itself acts as a functional aperture stop for the system; or holographic optical elements, including, but not restricted to, Fresnel "zone plate" optics.

Figure 2:
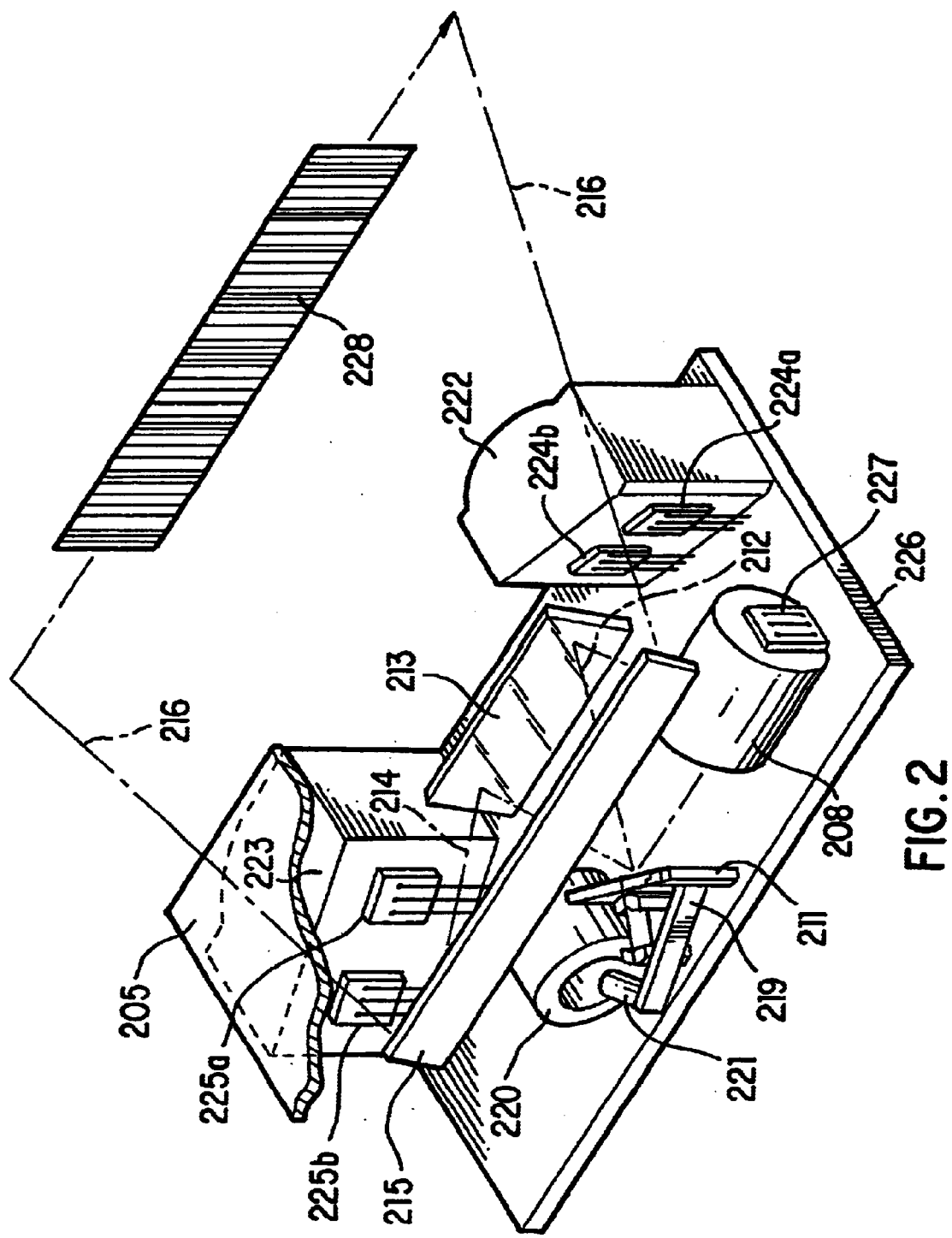
FIG. 2 is a partially sectioned perspective view of an optical assembly incorporating collection optics according to a second preferred embodiment of the invention.

Turning next to another embodiment, shown in FIG. 2 from a different perspective, the laser beam is directed to an optical element 211, such as a planar mirror, which is moved so as to cause the beam to be deflected into a scanning beam 216 which is directed exteriorly of the module 200 towards a target plane. The beam 216 is focused by the optical subassembly to form a spot on the target plane which moves along a scanning path across and through the bars of the bar code symbol 228 on the target plane as the mirror 211 moves.

The optical element 211 is mounted on the moving mirror assembly 219 which is caused to oscillate when alternating current is introduced in the coil 220. The oscillation results in a movement of the element 211 through an arc about a pivot axis.

The scanning mirror 211 is mounted for oscillation about an axis, this being achieved by virtue of the interaction between a permanent magnet 221 and a driven electromagnetic coil 220. A suitable driving signal is applied to the coil, via the PCB 207 and coil electrical contacts.

The scanner motor drive shown in the figures is exemplary, and may be replaced with any type of mechanism for effecting a scanning motion of the laser beam in one or two dimensions. For example, the scanner motor drive could comprise any of the configurations disclosed in U.S. Pat. No. 5,581,067 and U.S. Pat. No. 5,367,151, both of which are herein incorporated by reference. In this way, the optics assembly may be used as a component in a variety of scanner designs.

The light reflected from the symbol is received by the photodetectors 224a, 224b, 225a and 225b which are illustrated as discrete devices mounted behind the collection lenses 222.

The subassembly or device of FIGS. 1 and 2 may be implemented in any type of bar code reader, fixed or portable.

The photodetector output signal from the four photodetectors is then passed on to suitable electronics within a PCB 226 by an electrical coupling.

Although a light masking aperture may be used in front of each photodetector for increasing the depth of focus of the photodetector, the same effect can be achieved without an aperture by appropriately specifying the area of the photodetector itself.

In another preferred embodiment, the type of motor drive used to oscillate the scan mirror can be a Mylar (trademark) leaf spring supporting an unbalanced mirror assembly. The mirror assembly is mounted to a Mylar leaf spring which flexes as the permanent magnet is driven by the AC coil imparting an oscillating force.

Yet a further alternative is a "micro-machined" mirror assembly as discussed in U.S. patent application Ser. No. 08/506,574 and U.S. Pat. No. 08/631,364 according to which the mirror is driven back and forth directly by a suitable drive motor, preferably of very small dimension. Yet a further alternative is to use a mirror of known rotating polygon type as discussed in the introduction in relation to U.S. Pat. No. 4,251,798 according to which the mirror comprises a solid body having a plurality of faces angled to one another. As the body rotates, the beam is scanned by successive rotating faces of the polygon body. In one embodiment, the Mylar motor can be used in an arrangement for one-dimensional scanning while a V-shaped taut band element can be used for two-dimensional scanning.

The preferred laser is a semiconductor laser mounted by conventional through-hole techniques on the PCB. The photodiode is preferably an SMD ("surface mounted device") device as is the AC coil for the Mylar leaf spring motor. This eliminates the need for standoffs and hand-soldering or sockets, as are used on prior art scanners. Typically, the laser will be a standard packaged edge-emitting laser. For minimum cost, the laser focusing is not adjustable, and the laser is simply installed with its mounting flange in contact with a shoulder molded as part of a molded member. This will position the laser accurately enough with respect to a molded focusing lens to provide adequate performance within an inexpensive scanner. The fact that the focusing lens is molded as part of the same component as the shoulder minimizes tolerance build-ups that could otherwise cause improper focusing.

As shown in FIG. 2 of the drawings, the laser diode assembly 208 has downwardly-extending electrical leads 227 which are simply installed directly into the PCB 226. This eliminates hand-soldering, but soldering could be used if desired.

The collector optics 222 may be coated with a reflective coating so that light impinging upon it will be reflected toward the photodetector. This coating may also cover that part of the molded member that serves as a housing for the photodiodes. This will render the optics assembly opaque in that area to prevent any light from reaching the photodiode except via an aperture and a filter placed in front of each photodiode.

This reflective coating may also serve another function. Typically, the coating will be a thin film of metal such as gold, aluminum or chrome. These films are electrically conductive. Accordingly, the film also acts as an electromagnetic interference shield for the photodiodes. The use of a surface coating to protect the photodiodes enables the usual EMI shield to be dispensed with, thereby eliminating both the cost of a separate shield and the labor to have it installed within the assembly. The coating is electrically grounded.

The use of an unbalanced mirror, i.e., one in which no counterweights are provided in the mirror assembly 219, is particularly suitable in implementations in which the mirror is driven at a speed of greater than 100 scans per second. With an unbalanced mirror, since the attachment points of the mirror to the flexible springs is not the center of mass of the mirror assembly, while the mirror is at rest, gravity will exert a relatively greater force on the side of the mirror assembly having the greater mass, causing the mirror to "droop" on its heavier side and pull on the flexible springs. Of course, the effect of such force depends on the orientation of the scanner with respect to the force vector of gravity. The same "drooping" effect is present when the mirror is scanning at relatively low speeds. Hence, in such applications, the use of a balanced mirror would be preferred. A balanced mirror, however, requires additional mass be added to the mirror, or mirror assembly, which is a drawback in terms of operating design weight and the power requirements.

In the embodiment of high speed operation (i.e., at more than 100 scans per second), the material composition, size, shape and thickness of the springs may be appropriately selected to achieve the desired resonant frequency. For example, for operation at approximately 200 scans/second, the selection of a Mylar spring with a thickness of 4 mils is appropriate. For operation at 400 scans/second, a stainless steel spring with a thickness of about 3 mils is preferred.

Typically, the intensity of the collected reflected light signal from the middle portion of the scan line is much higher than the reflected light signal collected from the ends of the scan line when using a conventional single collection lens design in front of the photodetector. One embodiment of the present invention is to use a lens array(s). The lens array may have two or more collection lenses. Each individual lens of the array collects a reflected light signal from a particular portion of the scan line. The field of view (FOV) of each lens may overlap. The size of each lens and orientation may be optimized in such a way as to provide desired signal intensity uniformity along the scan line.

Figure 3:
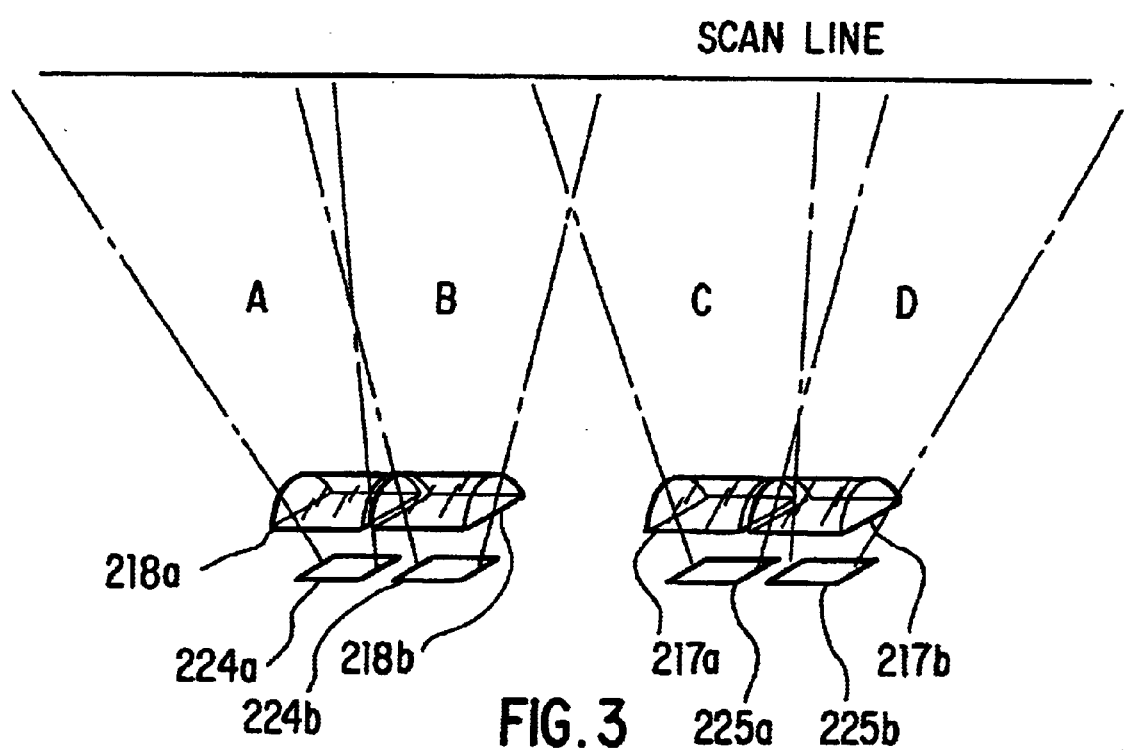
FIG. 3 is a schematic view depicting the use of four discrete photodectectors in the optical assembly according to another embodiment of the invention.

As illustrated in FIG. 3, each lens 218a, 218b, and 217a, 217b of the array may have an individual detector 224a, 224b and 225a, 225b which is, in turn, connected to an amplifier. The gain of each amplifier may be adjusted to optimize signal uniformity along the scan line.

If the FOVs labeled "A", "B" "C" and "D" of individual lenses are not overlapping, then the signals from those lenses may be combined together in such a way as to subtract the ambient light and improve ambient light immunity of the entire system. For example, if the FOV "A" does not overlap with the FOV "C", then assuming that the ambient light is roughly uniform across each FOV, then if the signals are subtracted, the ambient light is reduced but the useful signal of the laser beam is not since the laser spot does not present simultaneously in both FOVs. Subtracting the photodiode signal can be done in real time by reversing the signal with appropriate electronic circuitry. For example, the use of the combination defined by SIGNAL=|A−C|B−D| may reduce the ambient light contribution.

Signal uniformity as a function of the scan angle is very important for reliable bar code reader performance. The amount of signal collected by the collection optics may vary substantially with the scan angle. Typically, the signal varies as the fourth power of the cosine of the incident beam angle. Such signal variations limit the scanner performance, or may require complex electronics to compensate for the effect.

Typically, the intensity of the signal from the middle portion of the scan line is much higher than the intensity of the signal from light collected from the end portions of the scan line. One embodiment of collector optics design can improve the signal uniformity by equalizing the strong signal from the middle of the scan line (on-axis) to the level of the weaker signals from the ends of the scan line (off-axis).

In another embodiment, the present invention provides a sensor for detecting the reflected light and for generating an electrical signal corresponding to the symbol, the sensor including selectively activatable discrete first and second portions for receiving reflected light from respective first and second portions of the target corresponding to the position of the beam spot on the target.

In one embodiment, the sensor is vertically arranged such that the return light from an upper portion of the target is directed to the first portion, and the return light from a lower portion of the target is directed to the second portion. This embodiment is particularly suited to scanning a two-dimensional target, e.g., by a raster scanning beam.

In another embodiment, the sensor is horizontally arranged such that the return light from a right side of the target is directed to the first portion, and the return light from a left side of the target is directed to the second portion.

As a result, the strength of the collected light signal from the signals received from the ends of the scan line are effectively increased, while the signal received from the middle is reduced.

Figure 4:
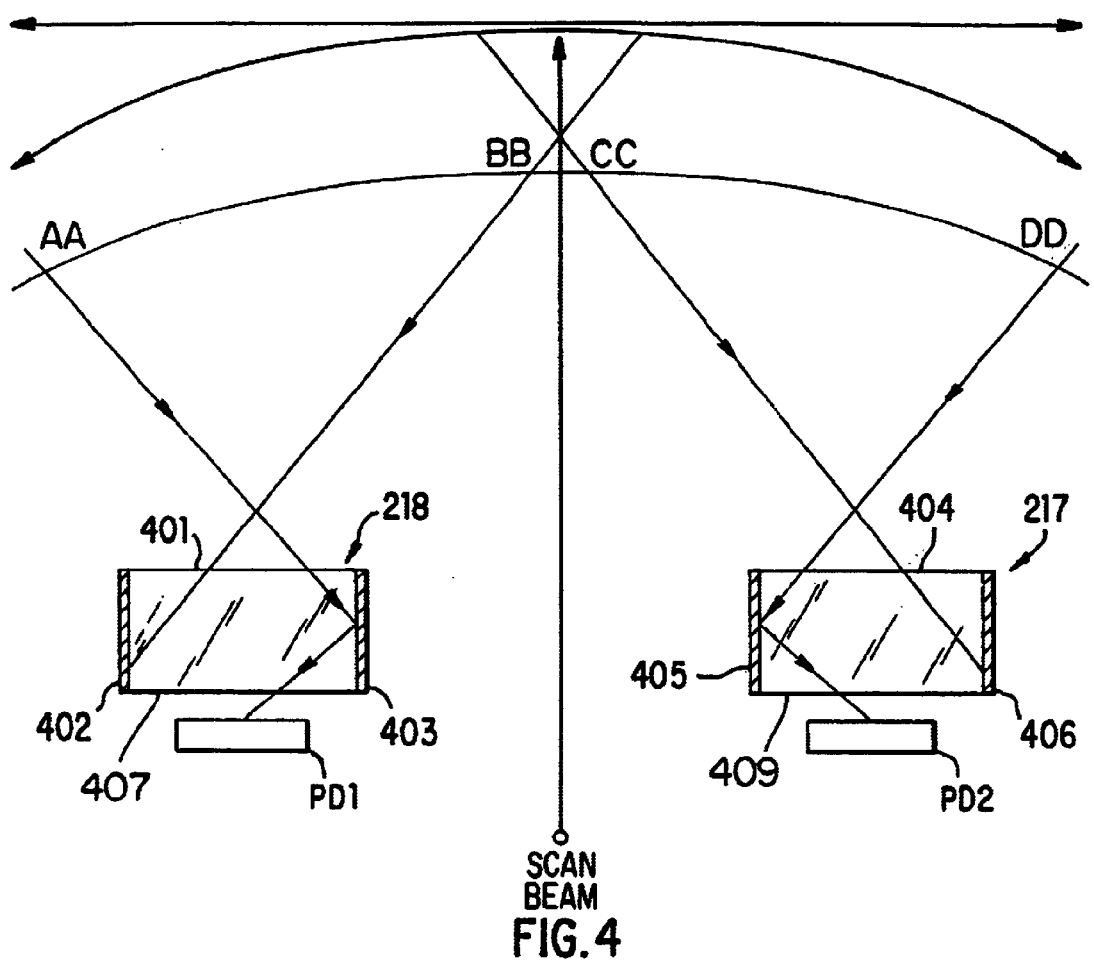
FIG. 4 is a diagram depicting the operation of the collection optics in the first embodiment of the present invention.

A similar approach is to provide collection optics so that the lens collects less light from one particular direction (e.g., the middle of the scan line) and more from the other (e.g., the ends of the scan line). Such an approach is illustrated in FIG. 4. FIG. 4 is a diagram depicting the operation of the collection optics shown in FIG. 1 according to the first preferred embodiment. The left lens 218 has a front surface 401, a pair of opposed side surfaces 402 and 403, and a rear surface 407. The side surface 403 has a reflective coating so that the beam AA, originating from the extreme end of the scan line, is reflected into the photodetector PD1. The side surface 402 has a non-reflecting coating, or surface treatment, so that the beam BB is absorbed or dissipated. The right lens 217 has a front surface 404, a pair of opposed side surfaces 405 and 406, and a rear surface 409. The side surface 405 has a reflective coasting so that the beam DD, originating from the opposite extreme end of the scan line, is reflected into the photodetector PD2. The side surface 406 has a non-reflecting coating, or surface treatment, so that the beam CC is absorbed or dissipated.

No special coatings need be provided at side surfaces 403, 405, because an untouched edge can provide a total internal reflection. No special coatings need be provided at side surfaces 402, 406 because these side surfaces can be frosted, diffused or roughened to provide the desired light absorption. By maximizing the weaker return signals from beams A, D, and by reducing the stronger return signals from beams B, C, the overall signal strength along the scan length is more uniform.

As an alternative, each side surface 402, 406 may be a polished optical surface, in which case, beams BB and CC are totally reflected to their respective photodetectors. The polished optical surfaces 402, 406 act like the reflective side surfaces 403, 405. This alternative is less preferred than the earlier embodiment wherein the opposite side surfaces have dissimilar properties.

Hence, in accordance with this invention, a relatively long scan line is generated closely adjacent the reader, and a symbol swept by such a scan line is read without requiring complex electronics to condition and process the return signal whose amplitude would otherwise vary unacceptably.

It will be understood that each of the features described above, or two or more together, may find a useful application in other types of scanners and bar code readers differing from the types described above.

While the invention has been illustrated and described, as embodied in the collection optics for a scan module for an electro-optical scanner, it is not intended to be limited to the details shown, since various modifications and structural changes may be made without departing in any way from the spirit and scope of the present invention. In particular, it will be recognized that features described in relation to one embodiment can be incorporated into other embodiments as appropriate in a manner that will be apparent to the skilled reader.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

We claim:

1. An arrangement for uniformly collecting light over a scan line swept over a symbol to be electro-optically read, the arrangement comprising:
   a) a pair of photodetectors spaced apart of each other and having fields of view that overlap each other at a working distance in which the symbol is located; and
   b) a pair of focusing lenses, one for each photodetector, each lens having a rear surface facing a respective photodetector, a front surface facing the symbol, and a pair of side surfaces extending between the front and rear surfaces, one of the side surfaces of a respective lens being operative for reflecting light passing from an end region of the scan line through a respective front surface to a respective photodetector via a respective rear surface, and the other of the side surfaces of the respective lens being operative for absorbing light passing from a central region of the scan line through the respective front surface.

2. The arrangement of claim 1, wherein said one of the side surfaces is a total internally reflecting surface.

3. The arrangement of claim 1, wherein said one of the side surfaces has a reflective coating.

4. The arrangement of claim 1, wherein said other ofthe side surfaces has a non-reflective coating.

5. The arrangement of claim 1, wherein said other of the side surfaces has a surface treatment that dissipates the light incident thereon.

6. The arrangement of claim 1, wherein said one ofthe side surfaces of each lens is located closer to an axis of symmetry than said other of the side surfaces of each lens.

7. The arrangement of claim 1, and a scan module on which the photodetectors and the lenses are supported, a light source on the module for emitting a light beam, and a scanner for sweeping the light beam to form the scan line.

8. The arrangement of claim 7, wherein the light source is a laser, and wherein each photodetector is a photodiode.

* * * * *

UNITED STATES PATENT AND TRADEMARK OFFICE
CERTIFICATE OF CORRECTION

PATENT NO.     : 6,702,184 B2                                           Page 1 of 1
DATED          : March 9, 2004
INVENTOR(S)    : Paul Dvorkis and Takeshi Yamazaki It is certified that error appears in the above-identified patent and that said Letters Patent is hereby corrected as shown below:

<u>Title page,</u>
Item [75], Inventors, change "Dvorka" to -- Dvorkis --.

Signed and Sealed this

Seventh Day of September, 2004

JON W. DUDAS
*Director of the United States Patent and Trademark Office*